Dec. 15, 1942.　　　　R. F. LESTER　　　　2,305,482
EXPLOSION PROOF HOUSING FOR PANEL MOUNTING
Filed Sept. 12, 1940　　　2 Sheets-Sheet 1

INVENTOR.
Ray F. Lester
BY Bodell & Thompson
ATTORNEYS.

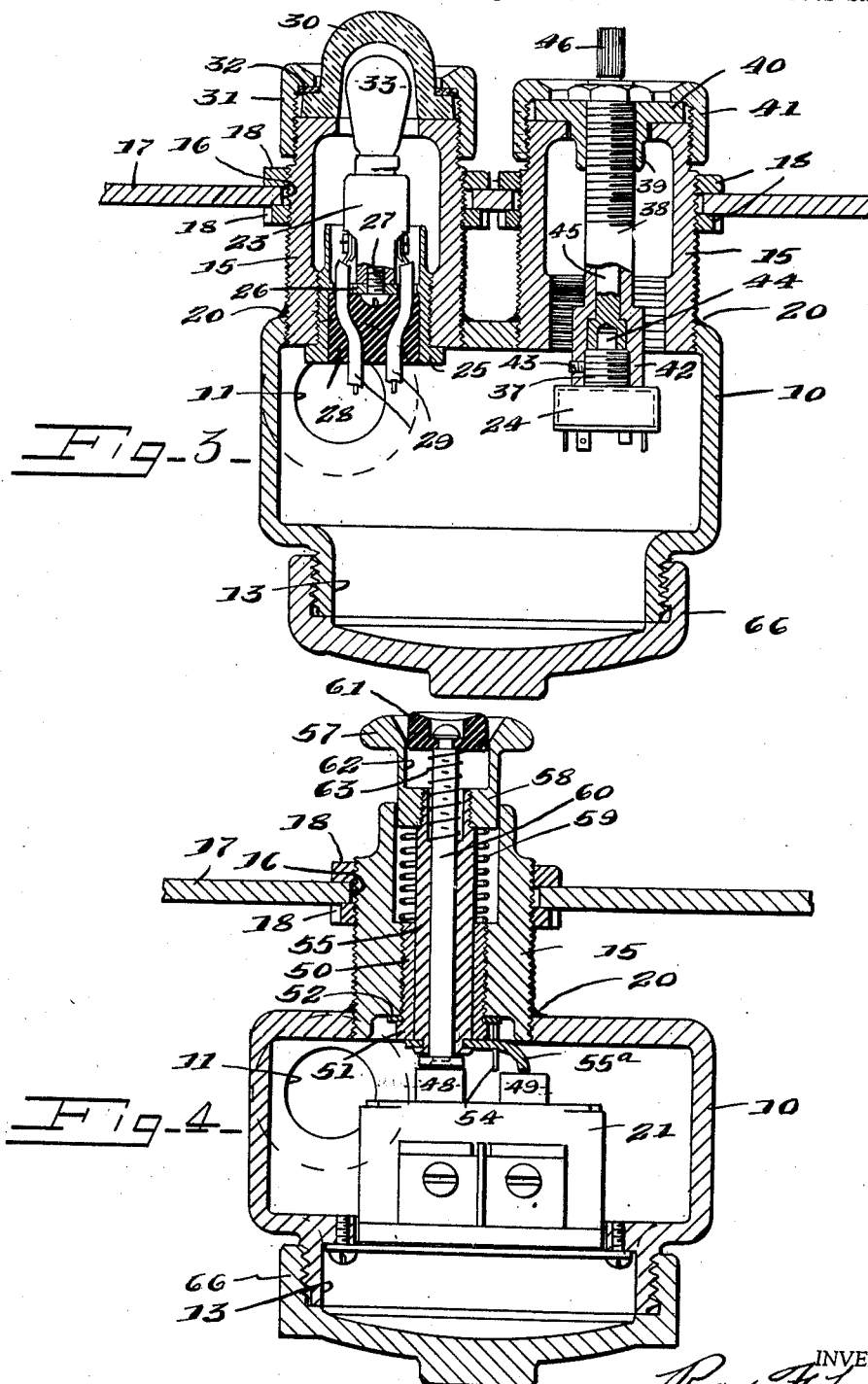

Patented Dec. 15, 1942

2,305,482

UNITED STATES PATENT OFFICE 2,305,482

EXPLOSIONPROOF HOUSING FOR PANEL MOUNTING

Ray F. Lester, Syracuse, N. Y., assignor to Crouse-Hinds Company, Syracuse, N. Y., a corporation of New York Application September 12, 1940, Serial No. 356,512

3 Claims. (Cl. 200—168)

This invention relates to an explosionproof housing for electrical apparatus which is intended particularly for panel mounting.

The invention has as an object an explosionproof housing embodying a construction whereby the housing may be quickly and conveniently installed in a panel or panel board, and rigidly secured thereto by means operable to effect convenient adjustment of the housing toward and from the rear or inner side of the panel.

The invention has as a further object an electrical fitting of the type referred to in which one or more pieces of apparatus may be installed, and embodying a mounting structure which also serves as an enclosure for the mechanism employed to operate the apparatus arranged in the fitting or, in the event a signal lamp is mounted in the fitting, the lamp is housed in the mounting structure, whereby it is only necessary for the workman to drill one hole in the panel to receive the mounting structure.

The invention consists in the novel features and in the combinations and constructions hereinafter set forth and claimed.

In describing this invention, reference is had to the accompanying drawings in which like characters designate corresponding parts in all the views.

Figure 3 is a vertical sectional view taken on line 3—3, Figure 1.

Figure 4 is a view, similar to Figure 2, illustrating a modified form of switch actuating mechanism.

Figure 1:
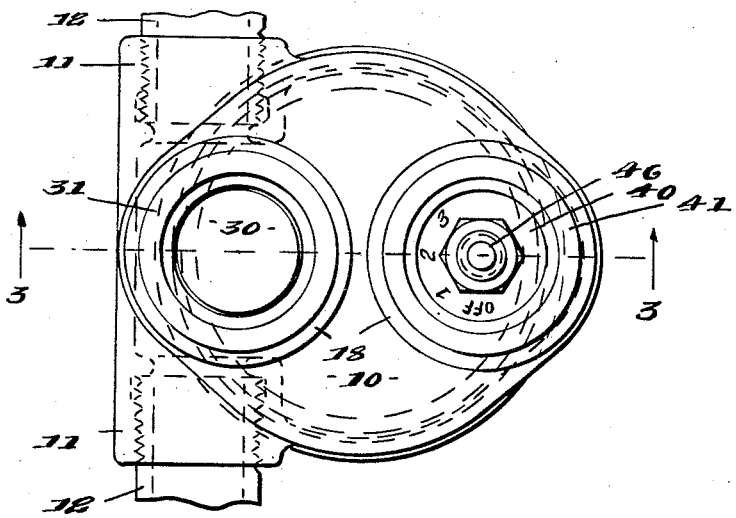
Figure 1 is a top plan view of a housing embodying my invention.

The housing consists of a body 10 formed of suitable cast metal and provided with one or more apertures 11 threaded internally to receive conduits 12. The body is also formed with a work opening 13 of appreciable dimension to permit insertion of the apparatus mounted in the housing and to make the electrical connections thereto.

The body is supported by a tubular projection 15 extending outwardly from one wall of the body, preferably the wall opposite to that in which the work opening 13 is formed. The tubular member or projection 15 is threaded externally and serves as a support for the body, the member extending through an aperture 16 formed in the panel 17. The tubular member 15 is provided with panel engaging means here shown in the form of collars or jam nuts 18 threaded upon the member and engaging opposite sides of the panel. With this arrangement the body may be adjusted toward and from the panel 17 and rigidly secured in adjusted position. The tubular member 15 may constitute a projection integral with the body. However, for manufacturing purposes it may be desired to provide the body with a threaded aperture into which the tubular member is threaded and is rigidly secured to the body as by welding 20.

Figure 2:
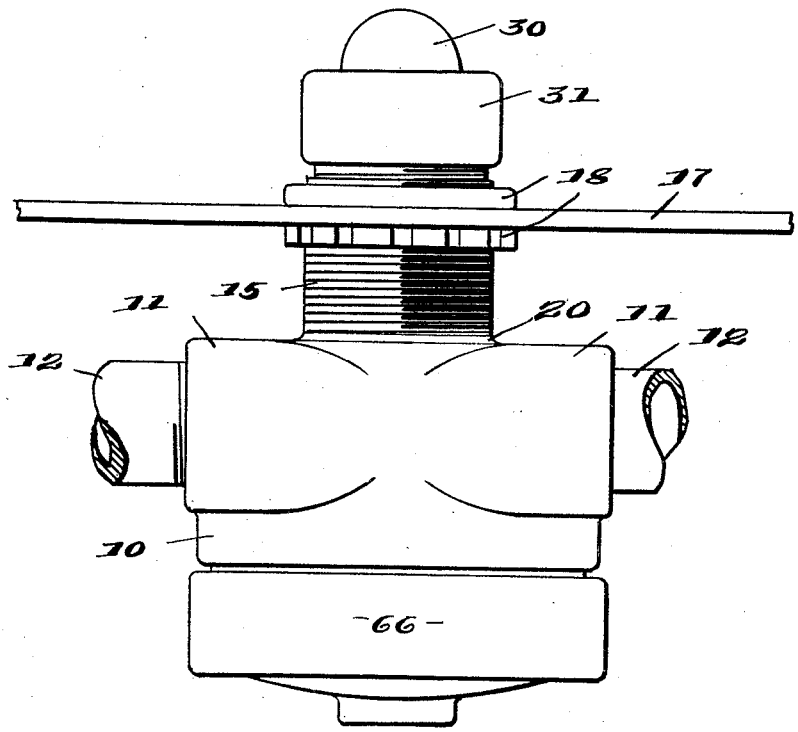
Figure 2 is a side elevational view of the housing and contiguous portion of the panel.

The body 10 may be of any suitable size or dimension and formed to accommodate one or a number of pieces of apparatus. For example, in Figure 4 the body is provided with a single tubular member 15 in which the actuating mechanism for the switch 21 is arranged. In Figures 1, 2 and 3, the body 10 is provided with two spaced tubular members 15, in one of which a lamp receptacle 23 is mounted, and the other makes provision for the support and actuating mechanism of a switch 24.

Referring to Figure 3, the lower or inner portion of the tubular member 15 is threaded internally to receive a receptacle support 25 formed with a partition 26 on which the receptacle 23 is mounted, as by screw 27. The lower portion of the receptacle support 25 forms a well for the reception of a sealing medium indicated at 28 through which the lead wires 29 extend and which serves to seal off the outer portion of the tubular member in flame tight relation from the interior of the body 10.

A suitable lens 30 is arranged on the outer end of the body and is detachably secured thereon in flame tight relation thereto by a sleeve nut 31 and gasket 32. With this arrangement, renewal of the lamp 33 is conveniently effected by unthreading the nut 31 from the end of the tubular member.

As the description proceeds it will be apparent that the housing embodying my invention is particularly flexible in that various types of switches and other apparatus can be conveniently mounted in the housing. In Figure 3, the switch 24 is of the type provided with an externally threaded stem 37, the switch being intended particularly for panel mounting or the like wherein the stem 37 extends through the panel and is secured thereto by a jam nut threaded on the outer end of the stem. In the embodiment shown, the switch is mounted in the end of a sleeve 38, the opposite end of which is threaded externally to receive a collar 39 having a radial flange 40 overlying the outer end of the tubular member 15 and being detachably secured thereto as by sleeve nut 41. The lower or inner end of the sleeve 38 is provided with an enlarged portion 42 threaded internally to receive the stem 37 of the switch which is secured against retrograde movement as by set screw 43. The actuating stem 44 of the switch is operatively connected to a shaft 45 extending axially through the sleeve 38 and provided at its outer end with a knurled portion 46. The switch is actuated into on and off positions by rotating the outer end 46 of the shaft 45.

It will be observed that the structure described forms a flame tight closure for the outer end of the tubular member 15, the flame tight connection being effected by the threaded connection between the sleeve 38 and the collar 39 and between the relatively wide flange 40 of the collar engaging the complemental end surface of the tubular member.

In Figure 4, I have illustrated the convenient manner in which the push button switch 21 may be mounted and operated from the housing. This switch is provided with the usual push buttons 48, 49. In this instance, a sleeve 50 is threaded into the lower end of the tubular member and is formed with an enlarged head 51 employed to maintain a washer 52 in position and from which depends a stop 54. A second sleeve 55 is slidably mounted in the sleeve 50 and is provided at its upper end with a button 57, the shank 58 of which is slidable in the outer end of the tubular member 15. The sleeve 55 and button 57 are yieldingly urged outwardly by a helical compression spring 59 encircling the sleeve and being interposed between the sleeve 50 and the button 57. The lower end of the sleeve 55 is provided with a radially extending arm 55ª, the outer end of which is arranged to engage the push button 49 and rotation of the sleeve 55 is prevented by engagement of the arm 55ª with the stop 54.

A stem 60 is slidably mounted in the sleeve 55 and is arranged to engage the push button 48. The outer end of the stem 60 is provided with a button 61 slidably mounted in a recess 62 formed in button 57. The stem 60 is yieldingly urged upwardly by helical compression spring 63 encircling the outer end of the stem being interposed between the button 61 and sleeve 55. Accordingly, the sleeve 55 and the stem 58 are independently actuatable exteriorly of the tubular member 15. The fitting is completed by a closure 66 detachably secured to the body as by being threaded thereon as indicated in Figures 3 and 4.

What I claim is:

1. An explosionproof housing for panel mounting comprising a body formed with a conduit receiving aperture and having a work opening in one side, an externally threaded tubular member extending outwardly from the body, panel engaging means threaded on said member and being operable to adjustably secure the housing to the panel, a switch suspended from said tubular member and switch actuating means extending axially through said member and being operable exteriorly thereof, and a closure for said work opening detachably secured to the body.

2. An explosionproof switch housing for panel mounting comprising a body formed with a conduit receiving aperture and having a work opening in one side, an externally threaded tubular member extending outwardly from the body, panel engaging means threaded on said member and being operable to adjustably secure the housing to the panel, a switch support carried by said tubular member and arranged to support a switch in the body, a closure for said work opening detachably secured to the body in flame tight relation thereto, and means for closing the outer end of said tubular member in flame tight relation.

3. An explosionproof housing for panel mounting comprising a body formed with a conduit receiving aperture and having a work opening in one side, an externally threaded tubular member extending outwardly from the body, a pair of panel engaging collars threaded on said member and being operable to adjustably secure the housing to the panel, a switch support arranged within said tubular member and adapted to support a switch in said body, means cooperable with said tubular member and said switch support to secure the same together in flame tight relation, and a closure for said work opening detachably secured to the body in flame tight relation thereto.

RAY F. LESTER.